3,137,809
MOTOR SERVO DRIVER
Robert A. Freiberg, Silver Spring, Md., assignor to the United States of America as represented by the Secretary of the Navy
Filed Apr. 6, 1962, Ser. No. 185,768
7 Claims. (Cl. 318—293)

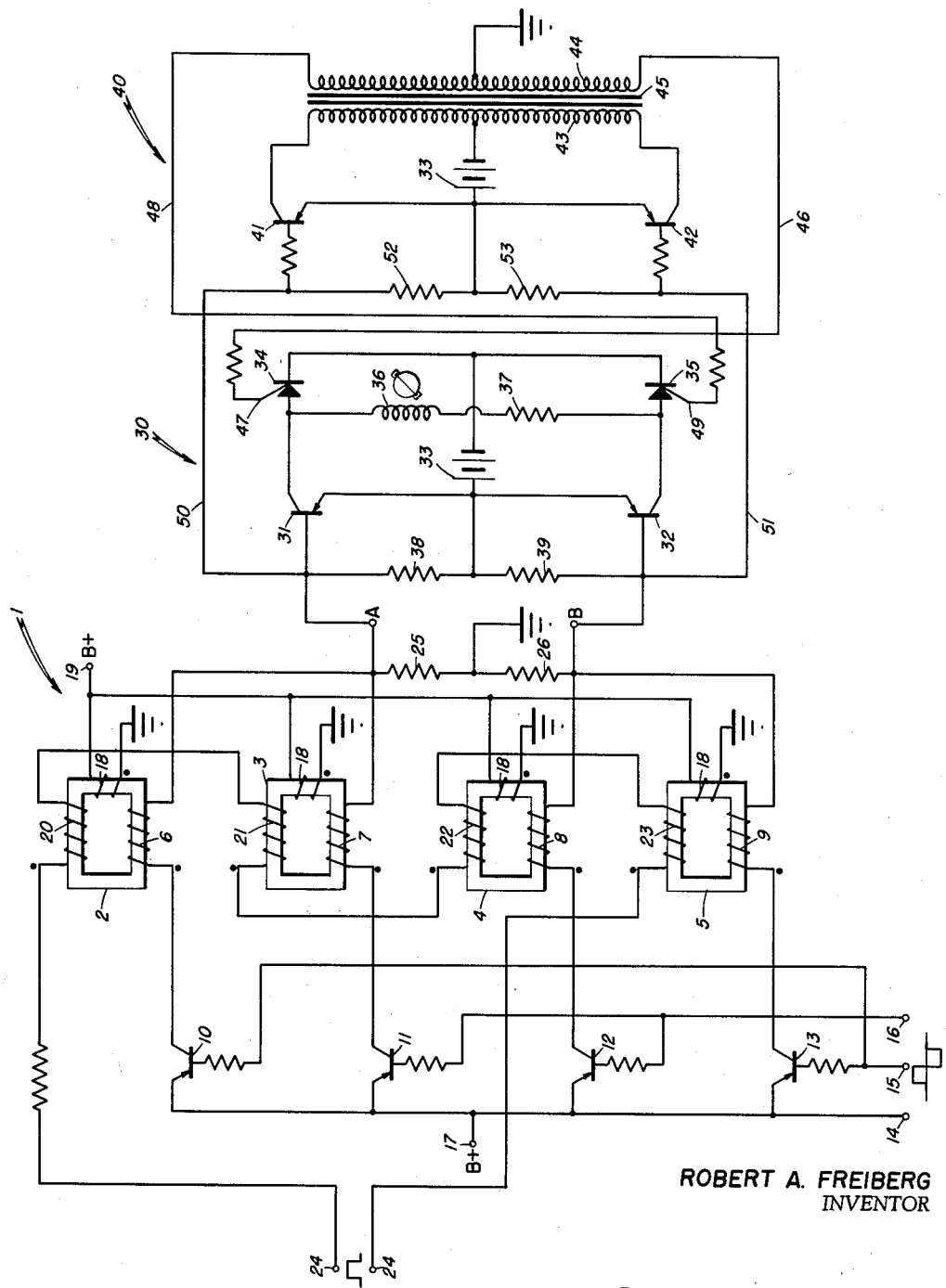
June 16, 1964    R. A. FREIBERG    3,137,809
MOTOR SERVO DRIVER
Filed April 6, 1962
ROBERT A. FREIBERG
INVENTOR
BY
ATTORNEYS "# United States Patent Office 3,137,809
Patented June 16, 1964

The present invention relates in general to guided missile control systems and more specifically to a magnetic control circuit for an electric servo motor.

As the rated velocity of a guided missile is increased, accurate and rapid control become very important to the overall effectiveness of the missile. This control has been provided to date by hydraulic servo-mechanisms; however, these systems are slow, inefficient, and they consume a great deal of power.

Much effort has been expended to adapt the electric motor to this type of system in place of the hydraulic valve. The prime difficulty encountered relates to a drive circuit for providing bi-directional control of the motor. In order to satisfy size and weight requirements an electric motor having a single field coil has been found to be most advantageous for use in missile control systems. However, because the motor has but a single control coil, a reversal of direction of the motor must either be accomplished by mechanical reversal of the power leads to the coil, such as through use of a commutator, or by provision of an electrical circuit in which current flow in the load may be gradually varied in both amplitude and direction.

It is therefore an object of the invention to provide an electric servo driver which will permit continuous control of both speed and direction in a single coil servo motor.

A further object of the invention is to provide an electric servo driver for effecting bi-directional control of a single coil servo motor which has rapid response and relatively low power consumption.

Another object of the invention is to provide an electric servo driver for effecting bi-directional control of a single coil servo motor utilizing a magnetic control circuit which is both rugged and dependable.

Other objects and many of the attendant advantages of this invention will be readily appreciated as the same becomes better understood by reference to the following detailed description when considered in connection with the accompanying drawing, wherein the figure is a schematic circuit diagram of one embodiment of the instant invention.

The electric circuit according to the invention which will produce the desired electrical control of a single coil motor is shown in the drawing. A magnetic control circuit generally designated at 1 comprises four saturable cores 2, 3, 4 and 5, respectively, each containing the standard bias, excitation, and control windings. The excitation windings 6, 7, 8 and 9 are connected via switching transistors 10, 11, 12 and 13, respectively, to a source of square wave excitation voltage at terminals 14, 15 and 16. The switching transistors are all biased off in the absence of an excitation voltage by a D.C. source of power at terminal 17 so that energization of the cores via the excitation windings depends upon application of a positive voltage to the bases of the switching transistors. Each of the switching transistors 10, 11, 12 and 13 has its emitter connected to power terminal 14 and its collector connected to one of the excitation windings 6, 7, 8 and 9, respectively. Windings 6 and 7 are in turn connected together at terminal A and windings 8 and 9 are connected together at terminal B, forming the output of the magnetic control circuit 1. The bases of transistors 10 and 13 and of transistors 11 and 12 are connected respectively to power terminals 15 and 16 so that the transistors will operate in pairs as the supply voltage changes polarity.

Each core contains a bias winding 18 which is connected across a common source of bias voltage 19. It may under certain circumstances be necessary to vary the bias on the individual cores and this may be accomplished either by providing separate sources of bias voltage to each winding 18 or by including suitable resistive elements in with the bias windings.

The control windings 20, 21, 22 and 23 are connected in series across input terminals 24. However, the windings 21 and 23 are wound in a sense opposite to that of windings 20 and 22 so that the two pairs of coils will have different saturation polarities.

Terminals A and B in the magnetic circuit 1 are connected to ground through voltage dropping resistors 25 and 26, respectively. The output voltage of the magnetic circuit 1 taken from terminals A and B is applied to an electric servo driver generally designated 30. The servo driver 30 comprises a pair of back-to-back transistors 31 and 32 having their emitters connected to a common source of D.C. voltage 33 and their collectors connected to a pair of voltage controlled silicon rectifiers 34 and 35, respectively. The motor field, comprising the load coil 36, is connected in series with a load resistor 37 across the collectors of transistors 31 and 32. A voltage divider consisting of a pair of serially connected resistors 38 and 39 is connected between the bases of the transistors and has its center tap connected to one side of voltage source 33.

The voltage controlled rectifiers 34 and 35 are regulated by a control circuit 40 comprising a pair of control transistors 41 and 42 having their emitters connected to common source of D.C. voltage 33 and having a transformer output 45 consisting of a primary winding 43 and a secondary winding 44. One end of winding 44 is connected via line 46 to the control electrode 47 of silicon rectifier 34 and the other end of winding 44 is connected via line 48 to the control electrode 49 of silicon rectifier 35.

The base of control transistor 41 is connected via line 50 to terminal A in the magnetic circuit 1 and the base of control transistor 42 is connected via line 51 to terminal B in the magnetic circuit. A voltage divider consisting of resistors 52 and 53 is connected between the bases of the transistors 41 and 42 and has its center tap connected to one side of common voltage source 33.

In operation, square wave excitation is applied to terminals 14, 15 and 16, rendering switching transistors 10 and 13 alternately conductive with transistors 11 and 12. Since the square wave excitation is symmetrical, both pairs of switching transistors will conduct for an equal length of time.

When the switching transistors 10 and 13 are conductive, the excitation voltage is applied simultaneously to windings 6 and 9 on cores 2 and 5, respectively. Cores 2 and 5 will have an equal saturation time and so a posi-"

tive voltage of equal magnitude and time duration will be applied to both terminals A and B.

When the polarity of the excitation voltage changes, transistors 10 and 13 will be rendered nonconductive and transistors 11 and 12 will conduct. Once again a positive voltage of equal magnitude and time duration will be applied to terminals A and B. Under these conditions since terminals A and B are both at the same positive voltage for the same time periods, the net voltage drop from A to B will be zero and no signal will be applied to the electric servo 30.

When a signal is applied to terminals 24, a signal bias will be applied to each of the cores via windings 20, 21, 22 and 23. However, since coils 21 and 23 are wound in a sense opposite to coils 20 and 22, the affect of the signal bias on cores 3 and 5 will be opposite to that on cores 2 and 4. Thus cores 2 and 4 will have a longer or shorter saturation time than cores 3 and 5 depending on the polarity of the signal current.

If a positive signal is applied to terminals 24 and transistors 10 and 13 are conductive, core 2 will saturate faster than core 5, thus making terminal A positive for a longer time than terminal B. Due to this unbalance there will be a period of time in which terminal A will be positive with respect to terminal B. This positive voltage will be passed on to the electric servo 30 making the base of transistor 31 positive with respect to its emitter and the base of transistor 32 negative with respect to its emitter. Transistor 32 will conduct and transistor 31 will be biased off.

In a like manner the voltage drop across A and B is transferred to the control circuit 40 via lines 50 and 51 so that the base of transistor 41 will be positive with respect to its emitter and the base of transistor 42 will be negative with respect to its emitter. Control transistor 42 will be biased to conduction and transistor 41 will be biased off. Upon conduction of control transistor 42, a positive voltage will pass through output transformer 45 to control electrode 47 on diode rectifier 34 via line 46. This signal voltage will render silicon diode 34 conductive.

Thus a positive voltage drop from terminal A to terminal B will render transistor 32 and silicon diode 34 conductive. This completes a current path from battery 33, through transistor 32, resistor 37, load 36, diode 34, and back to battery 33.

A reversal of the current through the load may be accomplished by merely reversing the polarity of the signal current applied to terminals 24. This will cause core 5 to saturate prior to core 2 providing a positive drop from terminal B to terminal A. In the same manner as heretofore described this voltage drop will be applied to the electric servo 30 and control circuit 40 so as to render transistor 31, transistor 41 and diode 35 conductive. A current path will then be completed from battery 33, through transistor 31, load 36, resistor 37, diode 35 and back to battery 33. The current flow through the load in this case is opposite to that of the previous example.

The above descriptions of circuit operation have been based upon the premise that transistors 10 and 13 are conductive and transistors 11 and 12 are nonconductive. However, the circuit will operate in an identical manner when the polarity of excitation voltage reverses and transistors 11 and 12 conduct rather than transistors 10 and 13.

The invention thus provides an electrical system capable of controlling both the speed and direction of a one coil electric motor, making complete electrical control of missile control surfaces possible. It also should be noted that bi-directional control of the servo motor is accomplished with but a single power source in the load circuit.

Obviously, many modifications and variations of the present invention are possible in the light of the above teachings. It is therefore to be understood that within the scope of the appended claims the invention may be practiced otherwise than as specifically described.

What is claimed is:

1. An electric servomechanism for controlling a single coil motor, comprising a magnetic control circuit providing an output voltage whose polarity is dependent upon the polarity of a common control signal, a driver circuit consisting of first and second transistors having their emitters connected to a common source of power, a pair of voltage controlled rectifiers, each rectifier being connected to one of said transistors and said common source of power, a bi-directional motor having a single field coil connected between the collectors of said transistors, and means responsive to the output of said magnetic control circuit for selectively triggering one of said rectifiers.

2. An electric servomechanism for controlling a single coil motor as defined in claim 1, wherein said means for triggering said rectifiers is a circuit controlled by said magnetic control circuit and having its output connected to said voltage controlled rectifiers so that conduction of said rectifiers occurs in response to the polarity of the output of the magnetic control circuit.

3. An electric servomechanism for controlling a single coil motor, comprising a magnetic control circuit providing an output voltage whose polarity is dependent upon the polarity of a common control signal, a source of power, a driver circuit consisting of first and second transistors controlled by said magnetic control circuit and having their emitters connected to said source of power, a pair of voltage controlled rectifiers, each rectifier being connected to one of said transistors and said source of power, a bi-directional motor having a single field coil connected between the collectors of said transistors, and means responsive to said magnetic control circuit for activating one of said rectifiers thereby controlling the direction of current flow in said field winding.

4. An electric servomechanism for controlling a single coil motor as defined in claim 3, wherein said means for activating said rectifiers is a circuit controlled by said magnetic control circuit and having its output connected to said voltage controlled rectifiers so that conduction of said rectifiers occurs in response to the polarity of the output of the magnetic control circuit.

5. An electric servomechanism for controlling a single coil motor, comprising a magnetic control circuit providing an output voltage whose polarity is dependent upon the polarity of a common control signal, a source of electric voltage, a driver circuit consisting of first and second transistors whose conduction is controlled by the polarity of the voltage from said magnetic control circuit and whose emitters are connected to said source of electric voltage, a pair of voltage controlled rectifiers, each rectifier being connected to one of said transistors and said source of electric voltage, a bi-directional motor having a single field coil connected between the collectors of said transistors, and means responsive to said magnetic control circuit for activating one of said rectifiers thereby controlling the direction of current flow in said field winding.

6. An electric servomechanism for controlling a single coil motor as defined in claim 5, wherein said means for activating said rectifiers is a circuit controlled by said magnetic control circuit and having its output connected to said voltage controlled rectifiers so that conduction of said rectifiers occurs in response to the polarity of the output of the magnetic control circuit.

7. An electric servomechanism for controlling a motor, comprising a magnetic control circuit having a plurality of magnetic amplifiers, means for applying a common control signal of predetermined polarity to the amplifiers of said control circuit, said control circuit producing an output which is dependent upon the polarity of said signal, a transistor driver circuit connected to the output of said magnetic control circuit, a bi-directional motor having a single field coil connected in the output of said driver circuit, a pair of voltage controlled rectifiers also connected in the output of said driver circuit, and a transistor trigger circuit for selectively triggering one of said rectifiers, said trigger circuit being controlled by said magnetic control circuit and having its output connected to said rectifiers so that the conduction of said rectifiers occurs in response to the output of said magnetic control circuit.

References Cited in the file of this patent

UNITED STATES PATENTS

| | | |
|---|---|---|
| 2,715,203 | Morgan | Aug. 9, 1955 |
| 3,050,672 | Alexanderson | Aug. 21, 1962 |
| 3,054,924 | Wetzger | Sept. 18, 1962 |